US006922731B1

(12) United States Patent
Morioka et al.

(10) Patent No.: US 6,922,731 B1
(45) Date of Patent: Jul. 26, 2005

(54) GATEWAY FOR REDUCING DELAY JITTER AND METHOD FOR DATA TRANSFER THEREIN

(75) Inventors: Masashi Morioka, Yokohama (JP);
Takashi Suzuki, Yokosuka (JP);
Toshiro Kawahara, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 905 days.

(21) Appl. No.: 09/660,041

(22) Filed: Sep. 12, 2000

(30) Foreign Application Priority Data

Sep. 22, 1999 (JP) ........................................... 11-268533

(51) Int. Cl.[7] .............................................. G06F 15/16
(52) U.S. Cl. ....................... 709/231; 709/232; 709/238; 370/516
(58) Field of Search ........................ 709/231, 232–235, 709/238; 370/516

(56) References Cited

U.S. PATENT DOCUMENTS

| | | | | |
|---|---|---|---|---|
| 5,268,900 A | * | 12/1993 | Hluchyj et al. ............. | 370/429 |
| 5,287,347 A | * | 2/1994 | Spanke ....................... | 370/235 |
| 5,640,388 A | | 6/1997 | Woodhead et al. | |
| 5,774,466 A | | 6/1998 | Hamamoto et al. ......... | 370/416 |
| 5,844,600 A | | 12/1998 | Kerr | |
| 6,006,300 A | * | 12/1999 | Toutant ...................... | 710/314 |
| 6,266,702 B1 | * | 7/2001 | Darnell et al. .............. | 709/236 |
| 6,304,574 B1 | * | 10/2001 | Schoo et al. ................ | 370/401 |
| 6,327,276 B1 | * | 12/2001 | Robert et al. ............... | 370/535 |
| 6,360,271 B1 | * | 3/2002 | Schuster et al. ............ | 709/231 |
| 6,385,198 B1 | * | 5/2002 | Ofek et al. .................. | 370/389 |
| 6,421,720 B2 | * | 7/2002 | Fitzgerald ................... | 709/224 |
| 6,496,477 B1 | * | 12/2002 | Perkins et al. .............. | 370/228 |
| 6,529,499 B1 | * | 3/2003 | Doshi et al. ................ | 370/352 |
| 6,535,906 B1 | * | 3/2003 | Barber et al. ............... | 709/200 |
| 6,580,694 B1 | * | 6/2003 | Baker ......................... | 370/252 |

FOREIGN PATENT DOCUMENTS

| | | |
|---|---|---|
| JP | A-8-154095 | 6/1996 |
| JP | A-9-74416 | 3/1997 |

OTHER PUBLICATIONS

ITU–T Recommendation H.223.
ITU–T Recommendation H.245.
ITU–T Recommendation H.320.
ITU–T Recommendation H.323.
ITU–T Recommendation H.324.
Kadur, S. et al., "Control of Delay Jitter in Continous Multimedia Applications" *Annual Review of Communications, National Engineering Consortium*, Chicago, IL, US, vol. 49, 1996, pp745–753.
Verma, D.C. et al., "Guaranteeing Delay Jitter Bounds in Packet–Switching Networks" *Proceedings of the IEEE International Workshop on Network and Operating Systems Support for Digital Audio and Video*, Nov. 8, 1990, 5 pages.
West, R. et al., "Dynamic Window–Constrained Scheduling for Multimedia Applications" *Proceedings of the International Conference on Multimedia Computing and Systems*, Los Alamitos, CA, US, vol.2, Jun. 7, 1999, pp87–91.

\* cited by examiner

*Primary Examiner*—David Wiley
*Assistant Examiner*—Phuoc Nguyen
(74) *Attorney, Agent, or Firm*—Brinks Hofer Gilson & Lione

(57) ABSTRACT

A gateway for interconnecting two networks, comprising a receiver, a controller, and a transmitter. The receiver receives from a first network a plurality of data units in all least one form. The controller temporarily stores the data units received by the receiver and outputs the data units on the basis of the dejitterizing capability of a destination terminal served by a second network, thereby reducing jitter among delays of the data units. The transmitter sends data units corresponding to the data units output by the controller to the destination terminal through the second network.

15 Claims, 13 Drawing Sheets

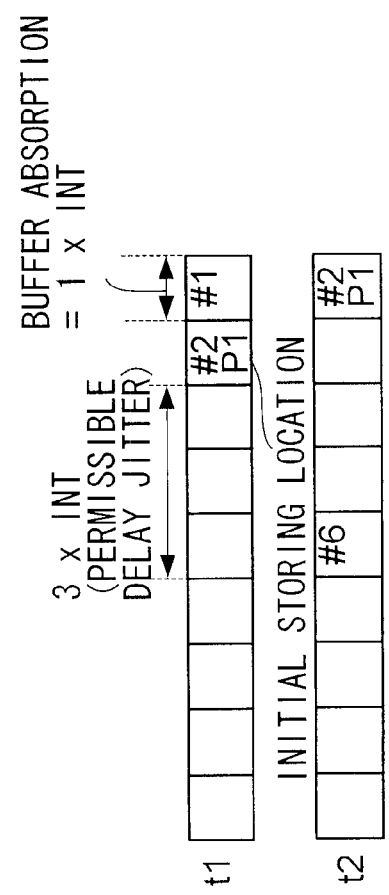
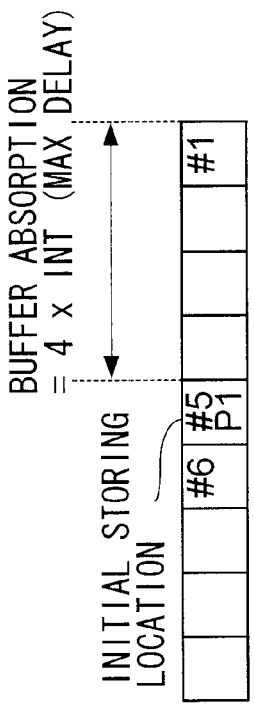
FIG. 5
FIG. 4

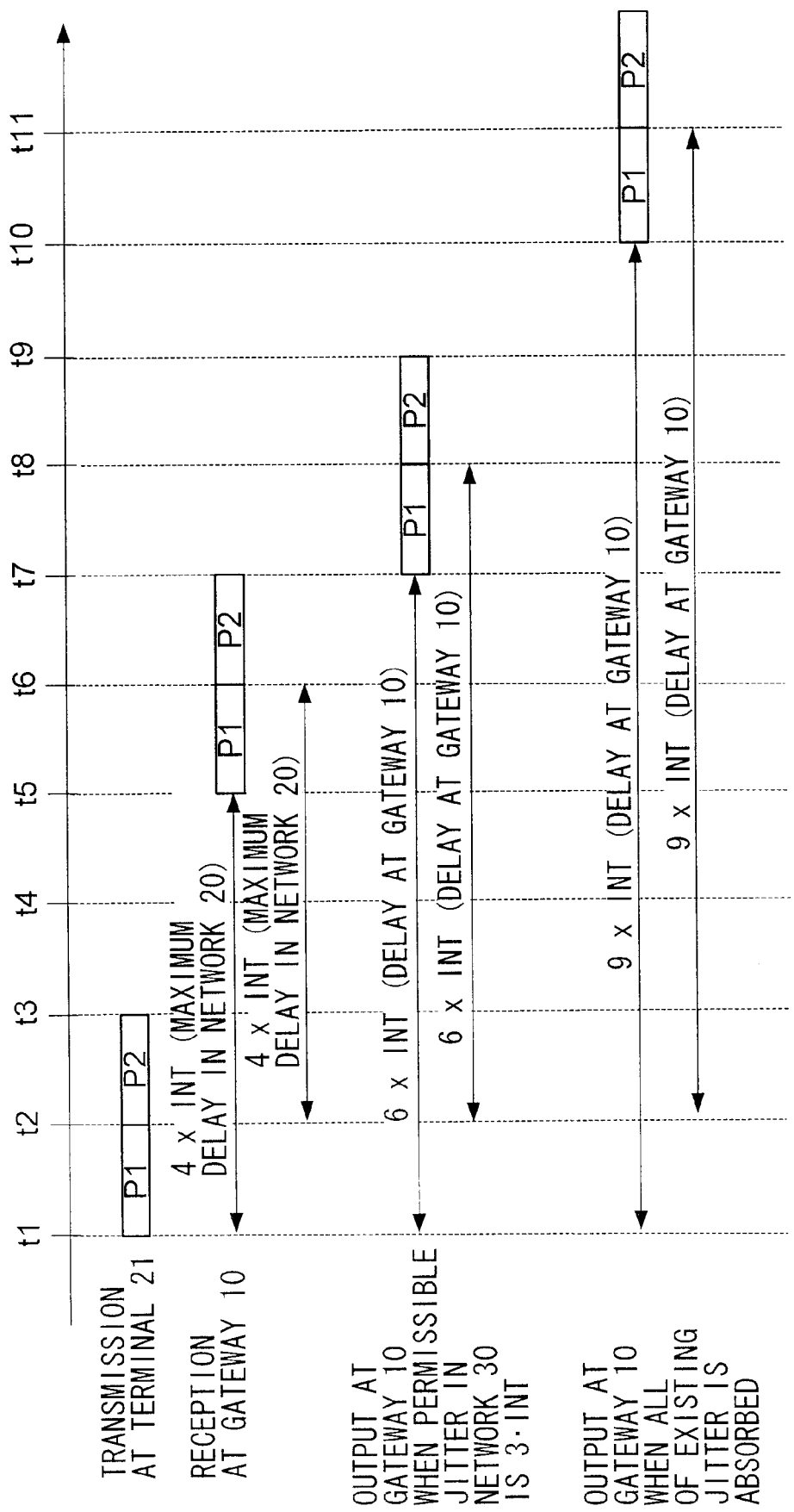

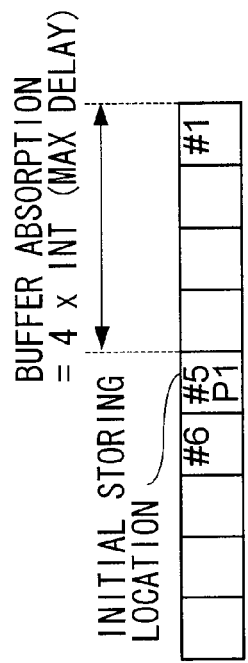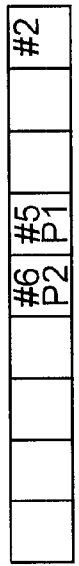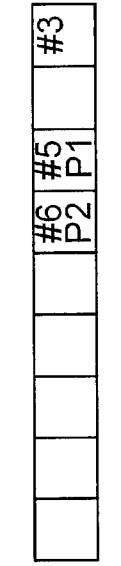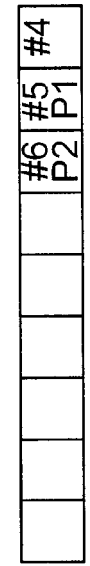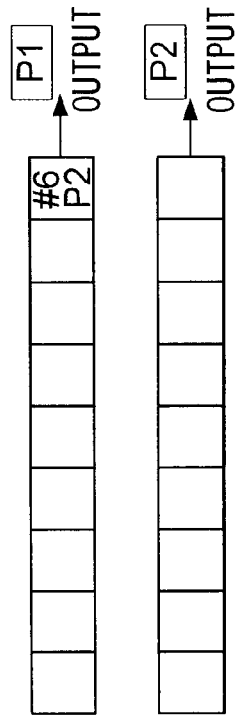
FIG. 8
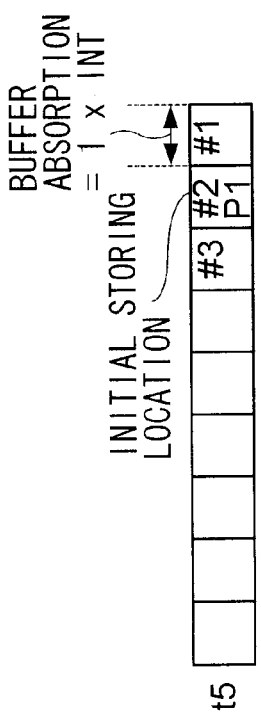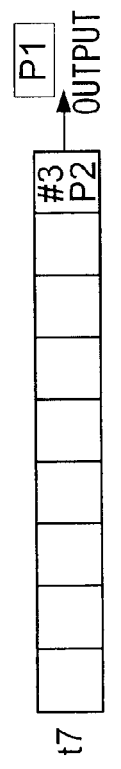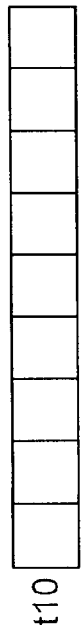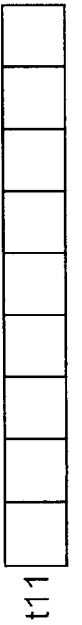
FIG. 7

GATEWAY FOR REDUCING DELAY JITTER AND METHOD FOR DATA TRANSFER THEREIN

BACKGROUND OF THE INVENTION

1. Field of the Invention

The present invention relates to a gateway for connecting a network where data propagation delays vary with another network and a data transfer method suitable for the gateway.

2. Related Art

Gateways are the indispensable components in order to achieve multimedia communications between terminals connected to heterogeneous networks that use different protocols and have different network characteristics. This type of gateway receives data following the protocol for the network to which the source terminal belongs and transmits the data pursuant to the protocol used in the network to which the destination terminal belongs. Consequently, the data from the source terminal passes through the network to which the source terminal belongs, the gateway, and the network to which the destination terminal belongs.

For multimedia communications, terminals complying with ITU-T Recommendation H.323 are commonly employed on packet-switched networks, such as the Internet, whereas terminals complying with ITU-T Recommendation H.324 are employed on circuit-switched networks, such as PSTN (public switched telephone network). Since Recommendations H.323 and H.324 use different transport protocols: RTP/UDP for H.323 and multiplexing protocol prescribed in H.223 for H.324, it is necessary to carry out the protocol conversion in a gateway for interconnection. Additionally, it is required to compensate for the difference in the network characteristics; delay, delay jitter and error characteristics, to achieve high quality multimedia communications.

Data propagation delays occur in networks due to various reasons, and delay times for data units may be different from each other. This kind of unwanted variation in the propagation delay time is called delay jitter. The causes of delay jitter may, for example, be the store-and-forward type exchange in a packet-switched network, packet or frame queuing at a node on the transmission path, or the fact that data units arrive at the gateway through different paths.

Even in a circuit-switched network, delay jitter is caused by simultaneous transmission of different forms of data. For example, multimedia terminals like videophones multiplex video, audio and/or application data into one bit stream. In such a case, while there will be data units that are immediately transmitted, there will also be data units that are kept waiting until the currently transmitted data unit is completed. This type of delay jitter could occur at both terminals and gateways, and would be larger as transmission bit rate becomes lower.

When delay jitter occurs, time intervals of data units in the source terminal cannot be maintained in the destination terminal. For transmitting data units, such as audio data units, for which highly precise synchronization is required, it is preferable to dejitterize for data units.

As means for dejitterizing, some communicating terminal can absorb a certain degree of delay jitter when it receives data units. For example, a communicating terminal temporarily stores data units, which are received with various delays, and outputs them successively after a series of data units have accumulated. However, since the occurrence factors and characteristics of delay jitter differ according to the network, it is difficult to know in advance how large the jitter among delays of data units which can be received by a destination terminal is. Therefore, the size of delay jitter which is permitted (or absorbed) in each destination terminal is often based on the likely maximum delay jitter that may occur in propagation through the network to which the terminal belongs. This results in the increase of end-to-end delay, which would be serious problem for real time communication.

SUMMARY OF THE INVENTION

The present invention provides a gateway and a data transfer method capable of minimizing the increase of delay by dejitterizing.

In accordance with an aspect of the present invention, a gateway for interconnecting two networks, may comprise: a receiver for receiving from a first network a plurality of data units in at least one form; a controller for temporarily storing the data units received by the receiver and for outputting the data units on the basis of the dejitterizing capability of a destination terminal served by a second network, thereby reducing jitter among delays of the data units; and a transmitter for sending data units corresponding to the data units output by the controller to the destination terminal through the second network.

Preferably, the gateway may further comprise an acquirer that may acquire information on the dejitterizing capability of the destination terminal.

In an embodiment of the present invention, the controller may determine a time period on the basis of the dejitterizing capability of the destination terminal, may output a first data unit of the data units after the determined time period has passed since a time moment at which the receiver received the first data unit, and may output subsequent data units successively in a cycle which is the same as that of transmission by the first network.

Advantageously, the receiver is capable of receiving from a first network data units of different forms while the controller may determine a precedence, in which the transmission of data units by the transmitter is carried out, in accordance with delay time of each data unit occurring in propagation through the first network when untransmitted data units in different forms exist simultaneously. In this case, the transmitter may multiplex the corresponding data units onto a channel in accordance with the precedence to send the corresponding data units to the destination terminal through the second network.

Preferably, the controller may include: an output time detector for detecting the time at which the first data unit in each form is output from the controller; and a delay calculator for calculating the delay time of each data unit based on the output time of the first data unit in each form. In this case, the controller may determine the precedence, so as to transmit the data unit, of which the determined delay time is longer than that of the other data unit, with priority over the other data unit.

The controller may obtain the time period to keep the first data unit by shortening a maximum delay time, which may occur in propagation of data units through the first network, on the basis of a permissible delay jitter at the destination terminal.

In accordance with another aspect of the present invention, a method for transferring data, may comprise: receiving from a first network a plurality of data units in at least one form; temporarily storing the data units; reducing jitter among delays of the data units on the basis of a dejitterizing capability of a destination terminal connected to a second network; and sending data units corresponding to the data units through the second network to the destination terminal.

BRIEF DESCRIPTION OF THE DRAWINGS

With reference to the accompanying drawings, an embodiment of the present invention will be described in detail hereinafter. In the drawings:

FIG. 4 is a diagram showing a procedure for treating data units in the buffer when the first packet with the minimum delay has arrived at the gateway;

FIG. 5 is a diagram showing another procedure for treating data units in the buffer when the first packet with the minimum delay has arrived at the gateway;

FIG. 6 is a time chart showing the procedures for treating data units in the gateway in FIG. 1 when the first packet with the maximum delay has arrived at the gateway;

FIG. 7 is a diagram showing a procedure for treating data units in the buffer when the first packet with the maximum delay has arrived at the gateway;

FIG. 8 is a diagram showing another procedure for treating data units in the buffer when the first packet with the maximum delay has arrived at the gateway;

DETAILED DESCRIPTION OF THE PREFERRED EMBODIMENT

Figure 1:
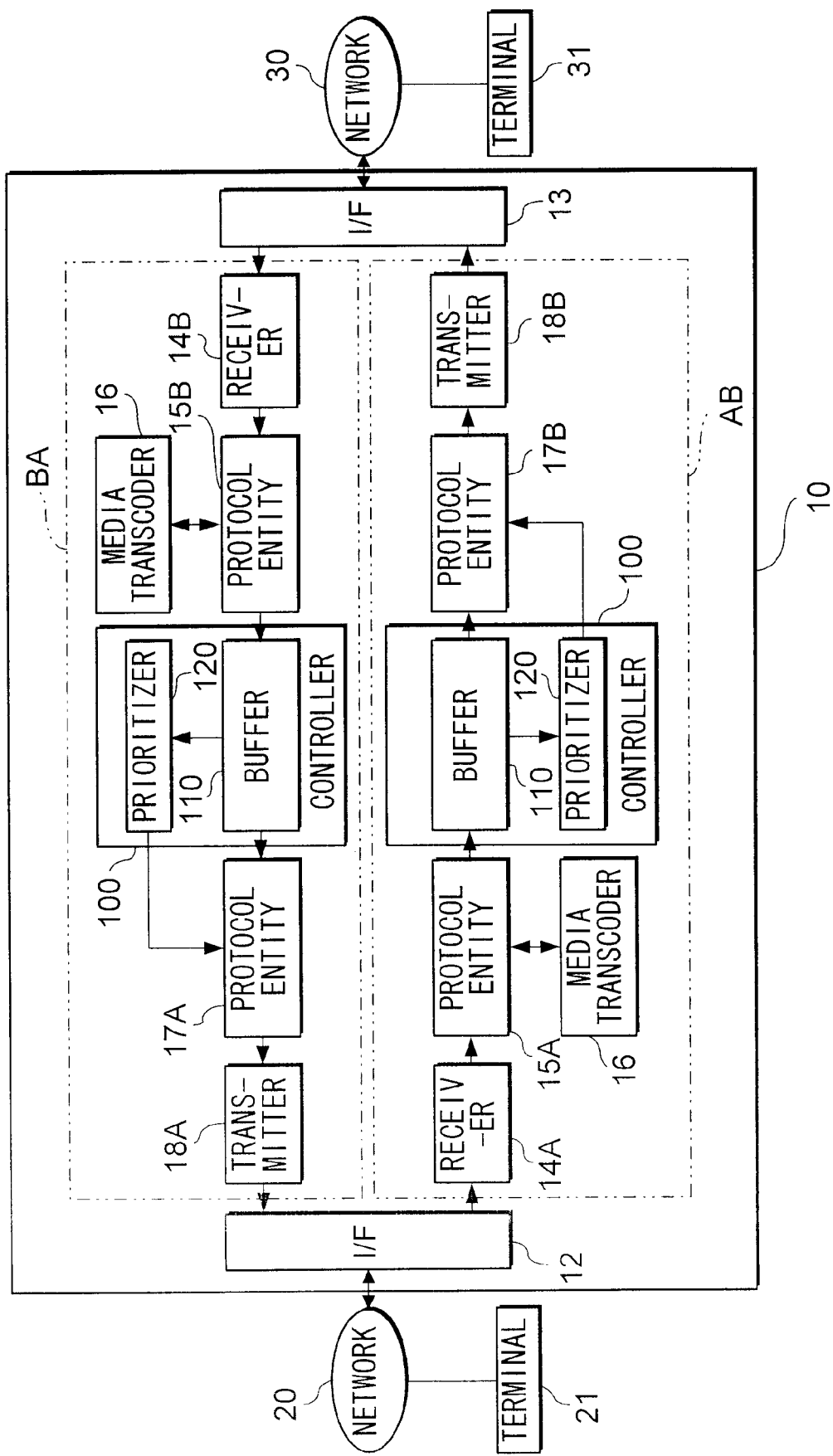
FIG. 1 is a block diagram showing a gateway according to a first embodiment of the present invention.

As shown in FIG. 1, in accordance with a first embodiment of the present invention, a gateway 10 interconnects two networks 20 and 30, whereby data can be transmitted from a source terminal served by the network 20 to a destination terminal served by the network 30, and data can be transmitted from a source terminal served by the network 30 to a destination terminal served by the network 20. Although each of the networks 20 and 30 can serve a number of terminals, FIG. 1 represents only terminals 21 and 31 served by the networks 20 and 30, respectively as a matter of convenience. Within each of the networks 20 and 30, data units in one or various forms can be exchanged.

In this embodiment, the network 20 is a packet-switched network where data units are transported being encapsulated in packets while the network 30 is a circuit-switched network where data units are transported as frames to be multiplexed into one bit stream: the frames includes audio and video data frames. However, it is not intended to limit the scope of the present invention to the disclosure. Rather, variations and modifications may be made within the scope of accompanying claims. The network 20 or 30 may be either of a mobile communications network or fixed network.

The gateway 10 comprises a network interface 12 for exchanging data with the network 20, another network interface 13 for exchanging data with the network 30, a transfer system AB for transferring data from the network 20 to the network 30, and another transfer system BA for transferring data from the network 30 to the network 20.

The transfer system AB includes a receiver 14A, protocol entity 15A, media transcoder 16, protocol entity 17B, transmitter 18B, and controller 100. Similarly, the transfer system BA includes a receiver 14B, protocol entity 15B, media transcoder 16, protocol entity 17A, transmitter 18A, and controller 1.00.

The receiver 14A receives a bit stream via the network interface 12 from the network 20. The bit stream includes data units (packets) in at least one form generated at a source terminal (e.g., terminal 21) served by the network 20. On the other hand, the receiver 14B receives a bit stream via the network interface 13 from the network 30, the bit stream including data units (frames) in at least one form generated at a source terminal (e.g., terminal 31) served by the network 30.

The protocol entity 15A terminates the protocol used in the network 20, and extracts payload data and its related information from each packet. If RTP/UDP is used as the transport protocol, the related information contains data type, timestamp (transmission time), sequence number and others. Similarly, the protocol entity 15B terminates the protocol used in the network 30.

The media transcoder 16 may execute format conversion for audio or video if necessary. For example, when different coding schemes are adopted for audio or video in the networks 20 and 30, such format conversion will be executed.

Each of the controllers 100 includes a buffer 110 for buffering data units from the protocol entity 15A or 15B. The controller 100 reads the data units from the corresponding buffer 110 in accordance with the preacquired dejitterizing capability (more specifically, permissible delay jitter) of the destination terminal (e.g., terminal 31) and outputs the data units to the protocol entity (e.g. protocol entity 17B) in order to transmit them to the network (e.g., network 30) corresponding to the destination.

For example, the dejitterizing capability information may be acquired by means for exchanging capability information as set forth in ITU-T Recommendation H. 245. ITU-T Recommendation H.245 prescribes various control protocols for multimedia communications. Multimedia terminals in compliance with ITU-T Recommendation H.324, H.323 and others also comply with ITU-T Recommendation H.245. A control protocol prescribed in ITU-T Recommendation H.245 includes procedures for exchanging capabilities of terminals, by which capabilities of communicating nodes may be exchanged. The procedures can be realized by transporting various control messages prescribed in ITU-T Recommendation H.245 between nodes. In this embodiment, the transfer systems AB and BA cooperate to acquire the information on the dejitterizing capability of the destination terminal, and the corresponding controller 100 stores the information.

When the gateway 10 receives from a network different types of data such as audio data units and video units for multimedia communication from a network (e.g., 20), each type of data units are stored in a buffer portion in the buffer 110, which is distinct from another buffer portion in the buffer 110 for storing another type of data units as will be described later. The controller 100 reads a type of data units in the buffer, and outputs them to the protocol entity (e.g., protocol entity 17A) to send them to the network (e.g., network 30) while distinguishing the data units from another type of data units.

As illustrated in FIG. 1, each controller 100 further includes a prioritizer 120, which is effectively utilized for multimedia communication dealing with different forms of data, as will be described later.

Each of the protocol entities 17A and 17B generates packets or frames from the data units read from the buffer 110, according to the protocol in the network to which the destination terminal is connected. Each of the transmitters 18A and 18B sends the adapted data units to the network serving the destination terminal.

With such a structure, data units from a source terminal connected to the network 20 to a destination terminal connected to the network 30 pass through the network 20 and arrive at the gateway 10. While the gateway 10 transfers the data units to a destination terminal connected to the network 30, it reduces delay jitter among the data units occurring in the network 20. Similar procedures are applied to the data units transmitted from a source terminal connected to the network 30 to a destination terminal connected to the network 20, whereby the gateway 10 reduces delay jitter occurring in the network 30.

In the following, assume that the source is the terminal 21 and the destination is the terminal 31. The packets transmitted from the terminal 21 and received by the gateway 10 have delays different from one another by the transportation through the network. The controller 100 of the gateway 10 reduces the delay variations (delay jitter) and then the gateway 10 transmits the packets in accordance with the protocol with which the network 30 complies.

Figure 2:
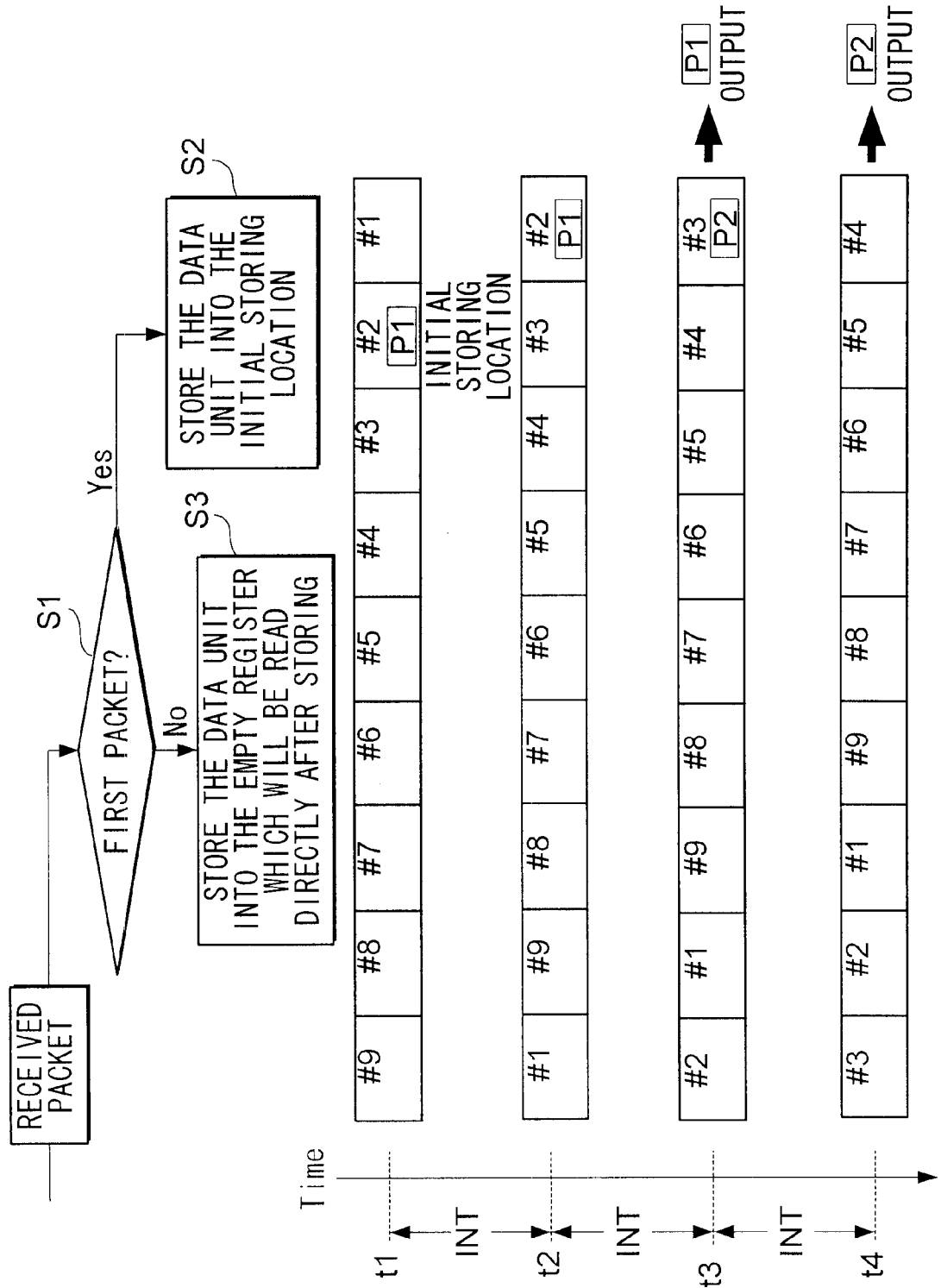
FIG. 2 is a diagram showing the operation of a buffer in the gateway in FIG. 1.

With reference to FIG. 2, buffering operation of the controller 100 for the received data units in a single form will be described. In this embodiment, the buffer 110 includes a predetermined number (e.g., nine in FIG. 2) of buffer registers #1 through #9. Each buffer register generally has a capacity equivalent to the length of packets, and stores the contents in a corresponding packet. At regular time intervals, the contents in subsequent buffer registers are read and output by the controller 100. The length of the intervals will be referred to as "INT." Time moments tn (t1, t2, t3 . . . ) differ from each other in the time interval "INT."

In the buffer 110 in FIG. 2, the data stored in the buffer register #9 is read and output at time moment t1. The data stored in the buffer register #1 is read and output at time moment t2. The data stored in the buffer register #2 is read and output at time moment t3. The data stored in the buffer register #3 is read and output at time moment t4. Thus, data units stored in adjacent buffer registers are output consecutively at regular time intervals. However, if no data has been stored in the buffer register, nothing is read and output.

Assume that a data unit of a packet P1 is stored at, the buffer register #2 in the buffer 110 at time moment t1 as shown in FIG. 2. In accordance with the above-mentioned manner, the data unit of the packet P1 in the buffer register #2 is output at time moment t3. Consequently, the data unit of the packet P1 is output a time period of 2×INT after the storage of it in the buffer 110.

Unlike the illustration in FIG. 2, assume that the data unit of the packet P1 is stored at the buffer register #1 at time moment t1. In accordance with the above-mentioned manner, the data unit of the packet P1 in the buffer register #1 will be output at time moment t2, which is a time period of 1×INT after the storage of it in the buffer 110.

As will be understood by the above description, storing the data unit, of the packet P1 at the second buffer register #2 makes an output delay of 1×INT corresponding to a single buffer register in comparison with storing it at, the first buffer register #1.

In this embodiment, the controller 100 determines the initial buffer register where the data unit of the first packet within packets in a form received from the network 20 should be stored, so as to adapt the time period from storing to outputting the data unit of the first packet for reducing delay jitter, which has occurred in propagation through the network 20. More specifically, the controller 100 selects one of the buffer register as the initial storing location for the data unit of the first packet in such a manner that the time period from storing to outputting the data unit of the first packet is equal to the extent to be reduced from the existing delay jitter as denoted by steps S1 and S2 of FIG. 2. Then, the controller 100 stores the data unit of each of the second and subsequent packets into the empty buffer register which will be the subject of reading by the controller 100 directly after storing, as denoted by step S3 of FIG. 2. Furthermore, the controller 100 refers to headers of packets and aligns the precedence of packets when the reception order at the receiver 14A has not accord with the transmission precedence of the source terminal for delay jitter (e.g., when the third packet arrives prior to the second packet). Therefore, the controller 100 stores the data units of packets into the buffer 110 in the correct order of transmission.

Returning to FIG. 2, the data unit of the first packet P1 received at time moment t1 is stored at the buffer register #2, which is the initial storing location. Assume that no packet is received at time moment t2 and a second packet P2 is received at time moment t3. If the packets P1 and P2 have been transmitted from the source consecutively, it can be considered that the delay of the packet P1 differs from the delay of the packet P2 by the time period of 1×INT for the reason of the transportation in the network 20. All time moment t3, the data unit of the second packet P2 is stored into the empty buffer register #3 which will be the subject of reading by the controller 100 directly after storing. Simultaneously, at time moment t3, the data unit of the packet P1 is read from the buffer register #2 of the buffer 110. At time moment t4, which is a time period INT after time moment t3, the data unit of the packet P2 is read out from the buffer register #3 of the buffer 110.

Therefore, although the second packet P2 has arrived at the gateway 10 with the delay that is longer than the delay of the first packet P1, the data units of the packets P1 and P2 may be output consecutively with eliminated delay jitter since the output of the data unit of the first packet P1 is delayed by a time period of 1×"INT." As described above, since the controller 100 aligns the precedence of packets, subsequent data units may also be output consecutively with the eliminated delay jitter.

The above-described buffering operation is based on the assumption that the permissible delay jitter is zero in the network 30 to which the destination terminal belongs. However, assuming that the destination terminal 31 can eliminate or absorb delay jitter being equal to the likely maximum level of jitter that may occur in the network 30, it may be unnecessary that the gateway 10 eliminates or absorbs all of delay jitter that has occurred in the network 20. However, the terminal 31 may not eliminate all of the delay jitter that has occurred in the network 20 if it is greater than that in the network 30. Accordingly, on the basis of the preacquired dejitterizing capability (permissible delay jitter) of the terminal 31, the controller 100 of the gateway 10 determines the extent to be reduced from the existing delay jitter. The determination operation will be described later in more detail.

Figure 9:
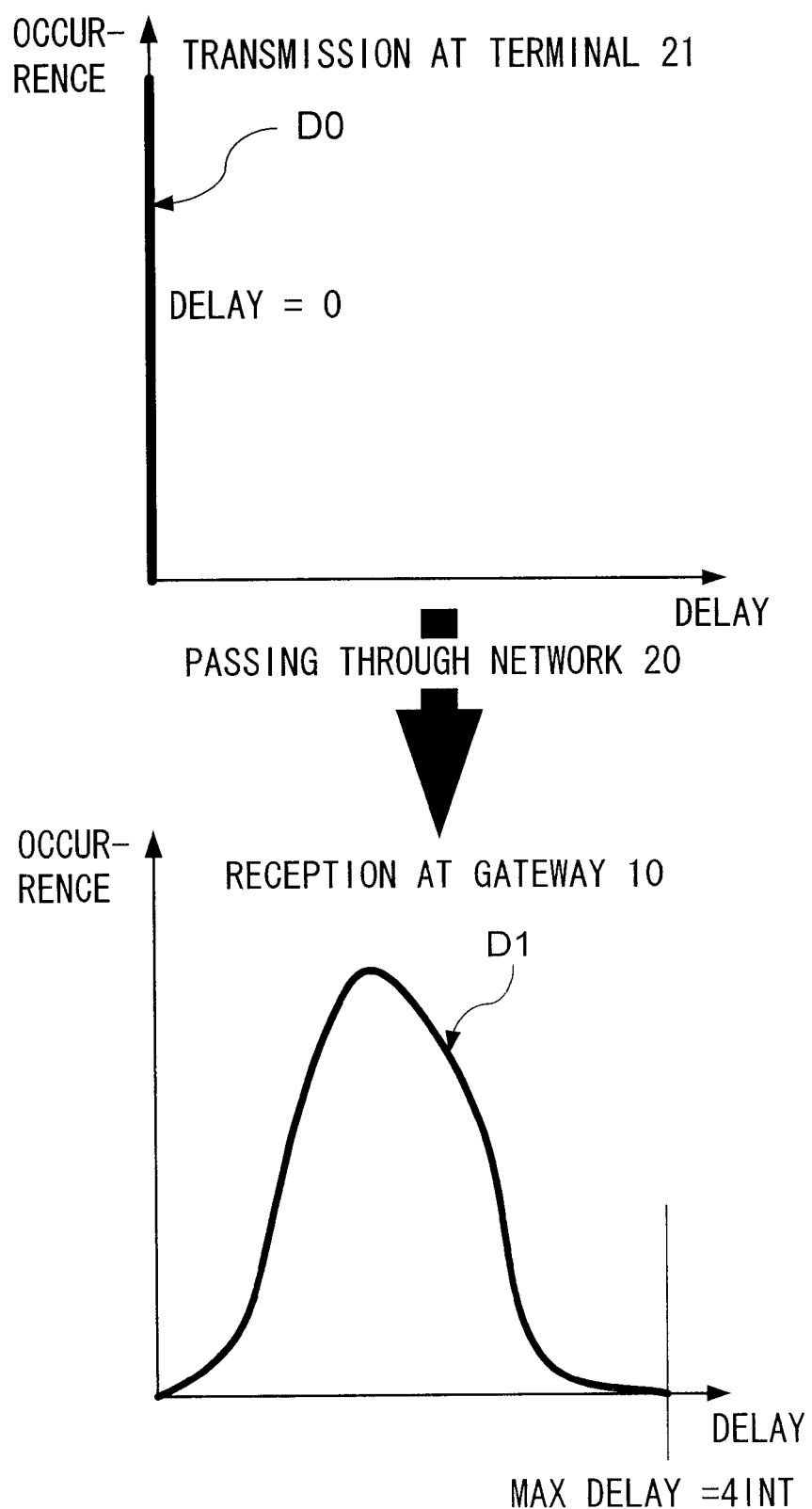
FIG. 9 includes graphs showing occurrence of network delays.

Although the existing delay jitter in the network 20 is 1×INT in FIG. 2, it may be greater in actual networks. As an example, FIG. 9 shows graphs: the upper represents the delay occurrence at the transmission by the source terminal 21 while the lower represents the delay occurrence at the reception by the gateway 10 after packets passed through the network 20. As will be understood by the straight line D0 in the upper graph of FIG. 9, all packets of course do not have any delay at the transmission from the terminal 21 and no delay jitter occurs at this stage. On the contrary, by transporting through the network 20, the packets have various delays, respectively when they arrive at the gateway 10. As will be understood by curved line D1 in the lower graph of FIG. 9, the maximum delay is 4×INT, the minimum delay is zero, and delay jitter is equal to the maximum delay (4×INT).

If the buffer 110 should absorb all delay, jitter of 4×INT occurring in the network 20 in FIG. 7, so that the initial storing location is the buffer register #5.

However, as described above, the controller 100 determines the extent of delay jitter to be reduced by the buffer 110 on the basis of the delay jitter occurring in the network 20 and preacquired information on the permissible delay jitter in the network 30 in accordance with the present embodiment. If the permissible delay jitter for the destination terminal 31 is 3×INT, the buffer 110 may absorb the extent of 1×INT in the delay jitter, so that the initial storing location is the buffer register #2.

In the following, the absorption of a part of delay jitter occurring in the network 20 will be described comparing with the absorption of all delay jitter occurring in the network 20.

Figure 3:
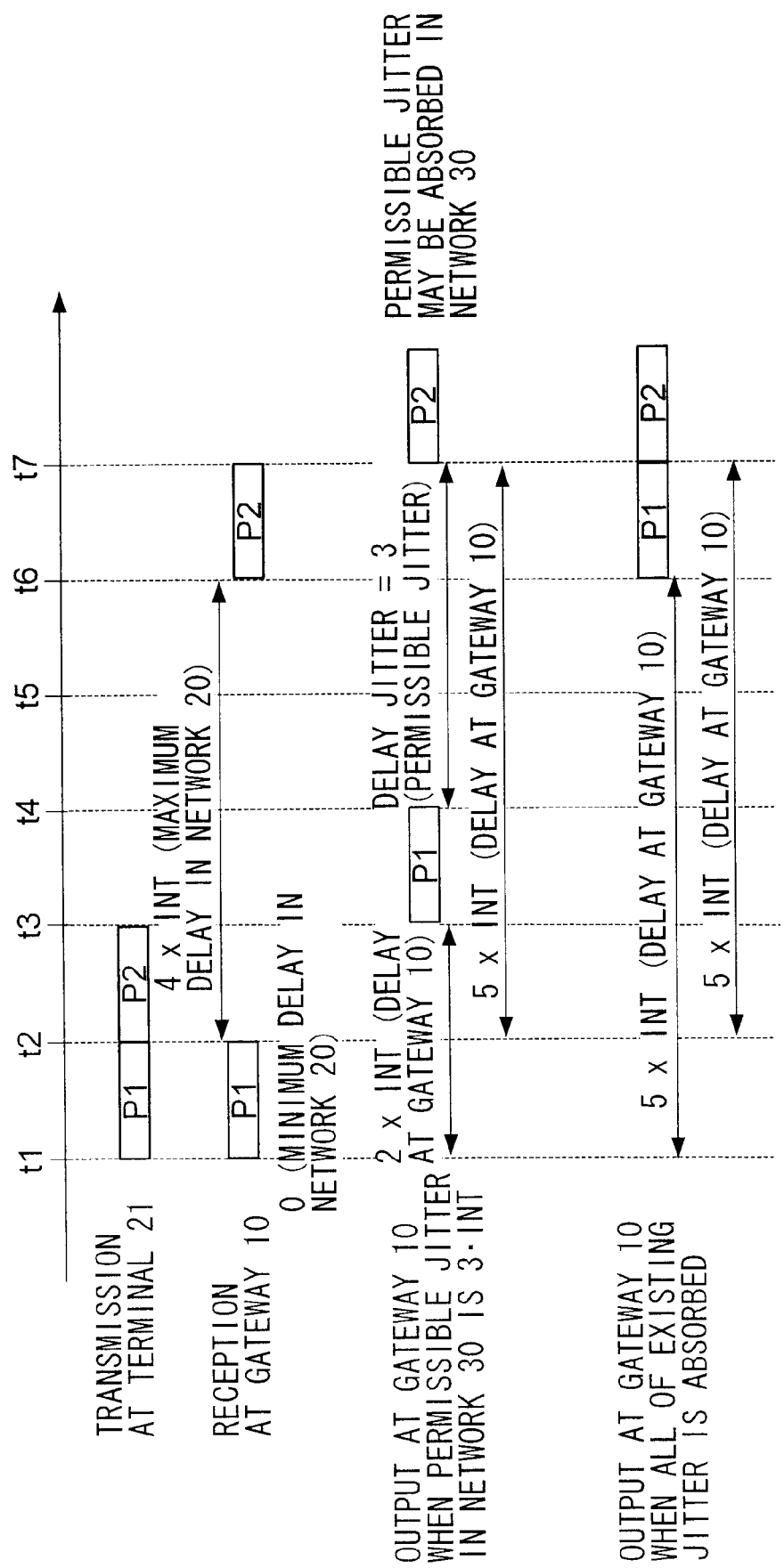
FIG. 3 is a time chart showing the procedures for treating data units in the gateway in FIG. 1 when the first packet with the minimum delay has arrived at the gateway.

As shown in FIG. 3, assume that the first packet P1 transmitted from the terminal 21 has the minimum delay (zero) when it arrives at the gateway 10 while the second packet P2 has the maximum delay (4×INT) when it arrives at the gateway 10. More specifically, the first packet P1 is transmitted from the terminal 21 at time moment t1, and the second packet P2 is transmitted from the terminal 21 at, time moment t2. The first packet P1 with the minimum delay (zero) arrives at the gateway 10 at time moment t1 even after passing through the network 20 and the second packet P2 with the maximum delay (4×INT) arrives at the gateway 10 at time moment t6.

If the permissible delay jitter in the network 30 to which the destination belongs is 3×INT, as shown in FIG. 4, the data unit of the packet P1 is stored into the buffer register #2 as described above. Therefore, the data unit of the packet P1 is output from the buffer 110 at time moment t3, which is 2×INT after time moment t1.

On the contrary, in the comparison mode wherein all of the delay jitter occurring in the network 20 is absorbed by the buffer 110, as described above, the data unit of the packet P1 should be stored into the buffer register #5 as shown in FIG. 5. Accordingly, the data unit of the packet P1 would be output, from the buffer 110 at time moment t6, which is 5×INT after time moment t1.

The data unit of the second packet P2, which arrived with the maximum delay (4×INT) at the gateway 10 at, time moment t6, is stored into the empty buffer register #6 which will be the subject of reading by the controller 100 directly after storing, and output at time moment t7, as shown in FIGS. 4 and 5.

If the permissible delay jitter in the network 30 to which the destination belongs is 3×INT, as shown in FIG. 4, the data unit of the packet P2 is output 4×INT after outputting P1. Accordingly, the buffer 110 has absorbed an extent of 1×INT among the delay jitter of 4×INT, which has occurred in the network 20, so that the delay jitter of 3×INT remains. The remaining delay jitter may be absorbed by the destination terminal 31. In this case, as shown in FIG. 3, the delay time between the transmission of the packet P1 by the terminal 21 and the output of the data unit of the packet P1 from the buffer 110 is 2×INT, and the delay time between the transmission of the packet P2 by the terminal 21 and the output of the data unit of the packet P2 from the buffer 110 is 5×INT.

On the contrary, in the comparison mode wherein all of the delay jitter occurring in the network 20 is absorbed by the buffer 110, as shown in FIG. 5, the data unit of the packet P2 is output 1×INT after outputting P1. Accordingly, the buffer 110 has absorbed all of the delay jitter of 4×INT, which has occurred in the network 20. In this case, as shown in FIG. 3, the delay time between the transmission of the packet P1 by the terminal 21 and the output of the data unit of the packet P1 from the buffer 110 is 5×INT, and the delay time between the transmission of the packet, P2 by the terminal 21 and the output of the data unit of the packet P2 from the buffer 110 is also 5×INT.

Next, with reference to FIGS. 6 through 8, the buffering operations in case that the first packet arrives at the gateway 10 with the maximum delay will be described, As shown in FIG. 6, assume that the first packet P1 is transmitted from the terminal 21 at time moment t1, and the second packet P2 is transmitted from the terminal 21 at time moment t2. The first packet P1 with the maximum delay (4×INT) arrives at the gateway 10 at time moment t5 after passing through the network 20 and the second packet P2 with the maximum delay (4×INT) also arrives at the gateway 10 at time moment t6. It should be noted a later packet must not be processed prior to a former packet since the controller 100 aligns the precedence again although the precedence of packets has been deranged.

If the permissible delay jitter in the network 30 to which the destination belongs is 3×INT, as shown in FIG. 7, the data unit of the packet P1 is stored into the buffer register #2 at time moment t5. Therefore, the data unit of the packet P1 is output from the buffer 110 at time moment t7, which is 2×INT after time moment t5. The data unit of the second packet P2, which arrived with the maximum delay (4×INT) at the gateway 10 at time moment t6, is stored into the empty buffer register #3 which will be the subject of reading by the controller 100 directly after storing, and output at time moment t8, which is 2×INT after time moment t;6, as shown in FIG. 7. As shown in FIG. 6, with respect to each of packets P1 and P2, the delay time between the transmission by the terminal 21 and the output of the data unit from the buffer 110 is 6×INT.

On the contrary, in the comparison mode wherein all of the delay jitter occurring in the network 20 is absorbed by the buffer 110, as shown in FIG. 8, the data unit of the packet P1 is stored into the buffer register #5 at time moment t5. Accordingly, the data unit of the packet P1 will be output from the buffer 110 at time moment t10, which is 5×INT after time moment t5. The data unit of the second packet P2, which arrived with the maximum delay (4×INT) at the gateway 10 at time moment t6, is stored into the empty buffer register #6 which will be the subject of reading by the controller 100 directly after storing, and output at time moment t11, which is 5×INT after time moment t6, as shown in FIG. 8. As shown in FIG. 6, with respect to each of packets P1 and P2, the delay time between the transmission by the terminal 21 and the output of the data unit from the buffer 110 is 9×INT.

As will be understood by the above description, by virtue of the buffer 110 in the gateway 10 interconnecting two networks, the data unit of the first packet is output a time moment after the gateway 10 received it, and each of the second and subsequent data units are output consecutively, whereby all or a part of delay jitter occurring in the network 20 can be absorbed.

As described above, in the comparison mode wherein all of the delay jitter occurring in the network 20 is absorbed by the buffer 110, even when the first packet with the minimum delay arrives at the gateway 10, the delay time between the transmission of each packet by the terminal 21 and the output of the corresponding data unit from the buffer 110 is 5×INT as shown in FIG. 3. Furthermore, when the first packet with the maximum delay arrives at the gateway 10, the delay is as much as 9×INT as represented in FIG. 6. The total delay time occurring in the route between the source and destination terminals 21 and 31 is the sum of the delay time between the transmission of each packet from the terminal 21 and the output of the corresponding data unit from the buffer 110 and the delay occurring in the network 30. Therefore, increase in the delay time in the route between the terminal 21 and the buffer 110 results in increase in the total delay time.

However, if a part of the delay jitter is absorbed, when the first packet has the minimum delay, the delay time between the transmission of packet P1 by the terminal 21 and the output of the data unit of the packet P1 from the buffer 110 is 2×INT as shown in FIG. 3. When the first packet has the maximum delay, the delay of each packet is 6×INT as represented in FIG. 6. Accordingly, the total delay time occurring in the route between the source and destination terminals 21 and 31 can be lessened by the adjustment of the extent of delay jitter to be absorbed on the basis of the permissible delay jitter in the network 30. As described with reference to FIGS. 3, 4, and 7, the absorption of a part of delay jitter results in a remaining delay jitter, but it can be absorbed by the destination terminal 31.

Next, an application of present embodiment into multimedia communication dealing with different forms of data will be described.

In multimedia communication, each of the protocol entities 15A and 15B (refer to FIG. 1) distinguishes data units in a form from data units in another form while different forms of data are simultaneously treated.

The prioritizer 120 of each controller 100 prioritizes data units. More specifically, it determines the precedence, in which the transmission of data units is carried out, in accordance with delay time of each data unit.

On the basis of the precedence information provided from the prioritizer 120, the corresponding protocol entity 17A or 17B maps the data units onto the channel for multiplexing the data units. Per mapping by the protocol entity 17A or 17B, the corresponding transmitter 18A or 18B multiplexes the data units to the network 30.

Figure 10:
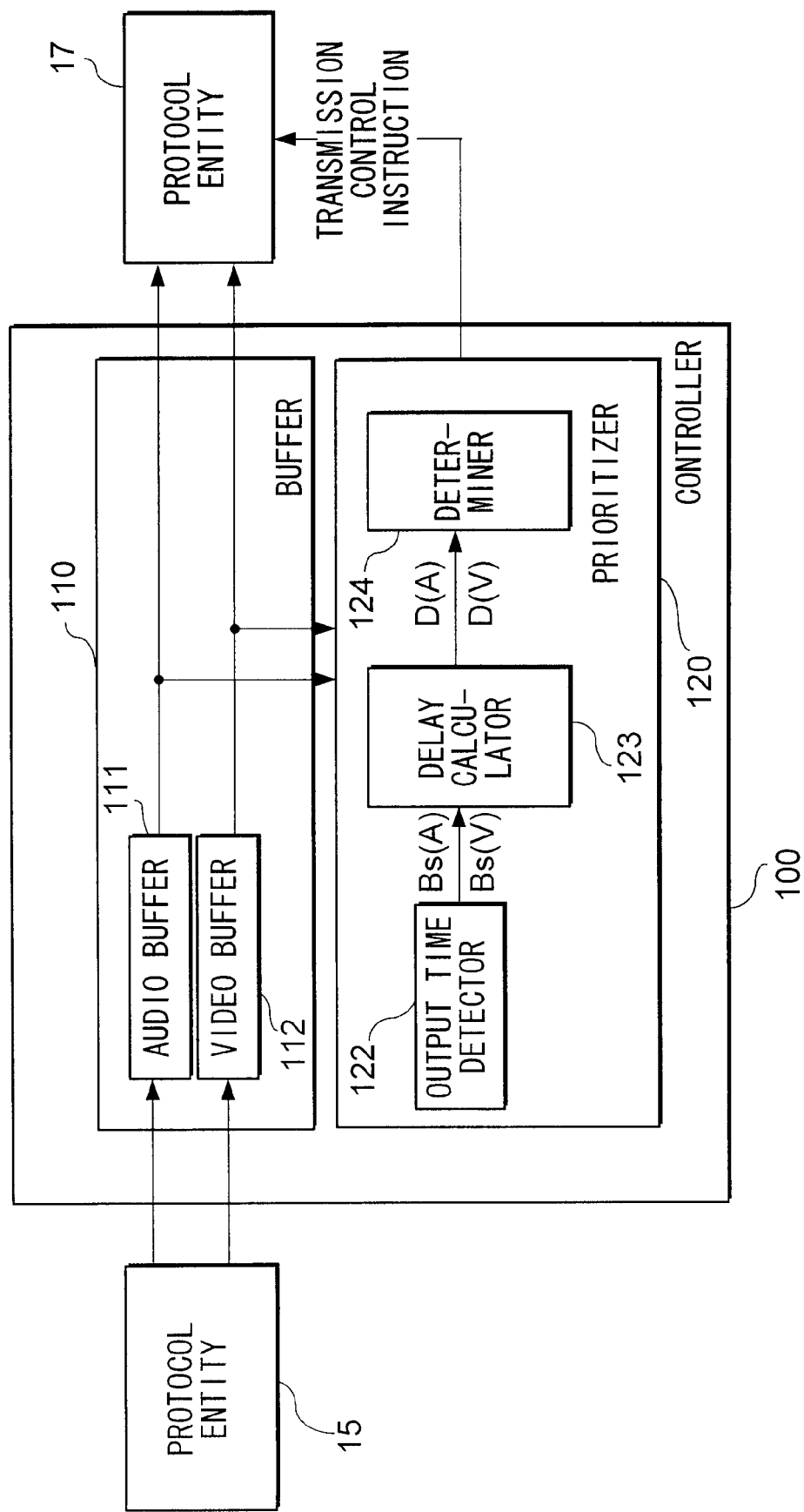
FIG. 10 is a block diagram showing functional entities inside each controller of the gateway in FIG. 1.

FIG. 10 shows inside functional entities in each controller 100. In the following description, the protocol entity 15A or 15B will be referred to as protocol entity 15, and the protocol entity 17A or 17B will be referred to as protocol entity 17 as denoted in FIG. 10.

As illustrated in FIG. 10, the buffer 110 includes an audio buffer portion 111 and a video buffer portion 112. The prioritizer 120 includes an output time detector 122, delay calculator 123, and determiner 124.

The audio buffer 11.1 stores data units corresponding to audio data packets provided from the protocol entity 15 while the video buffer 112 stores data units corresponding to video data packets provided from the protocol entity 15. Data units read from the audio buffer 111 and data units from the video buffer 112 are independently supplied to the protocol entity 17.

Additionally, audio data unit and video data unit read from the audio buffer 111 and video buffer 112 are supplied to the prioritizer 120. The prioritizer 120 includes an output time detector 122, delay calculator 123, and determiner 124.

The output time detector 122 detects the time of output from the buffer 110 with respect to each of the first audio and video units on the basis of an inside clock of the gateway 10. Then, the detector 122 provides the delay calculator 123 with the output time information. The output time of the first audio data unit, from the audio buffer 111 will be referred to as Bs(A) while the output time of the first video data unit, from the video buffer 112 will be referred to as Bs(V).

The delay calculator 123 calculates a standard output time Ss(A) of an audio data unit that has not been transmitted from the protocol entity 17. The standard output time Ss(A) is a time moment at which the audio data unit should be output from the buffer 110 if no delay has occurred, and is reckoned from the output time Bs(A) of the first audio data unit. Furthermore, the delay calculator 123 calculates an audio delay time D(A) that is the difference between the current time moment Ct and the standard output time Ss(A) of the audio data unit that has not been transmitted from the protocol entity 17, and provides the determiner 124 with information on the audio delay time D(A). The delay calculator 123 also calculates a standard output time Ss(V) of a video data unit that has not been transmitted from the protocol entity 17. The standard output time Ss(V) is a time moment at which the video data unit should be output from the buffer 110 if no delay has occurred, and is reckoned from the output time Bs(V) of the first video data unit. Furthermore, the delay calculator 123 calculates a video delay time D(V) that is the difference between the current time moment Ct and the standard output time Ss(V) of the video data unit that has not been transmitted from the protocol entity 17, and provides the determiner 124 with information on the video delay time D(V). Each delay time D(A) or D(V) can be a sufficient measure for comparing the delay of an audio data unit in relation to the first audio data unit with the delay of a video data unit in relation to the first video data unit.

When an audio data unit and a video data unit that have been output from the buffer 110 and have not been transmitted from the protocol entity 17 exist simultaneously (for example, when an audio data unit and a video data unit are read respectively from the audio buffer 111 and video buffer 112 at the same time), the determiner 124 compares the audio delay time D(A) of the subject audio data unit with the video delay time D(V) of the subject video data unit. On the basis of the comparison, the determiner 124 prepares a transmission control instruction for controlling the precedence, in which the transmission of data units is carried out by the protocol entity 17, and supplies the instruction to the protocol entity 17.

Figure 11:
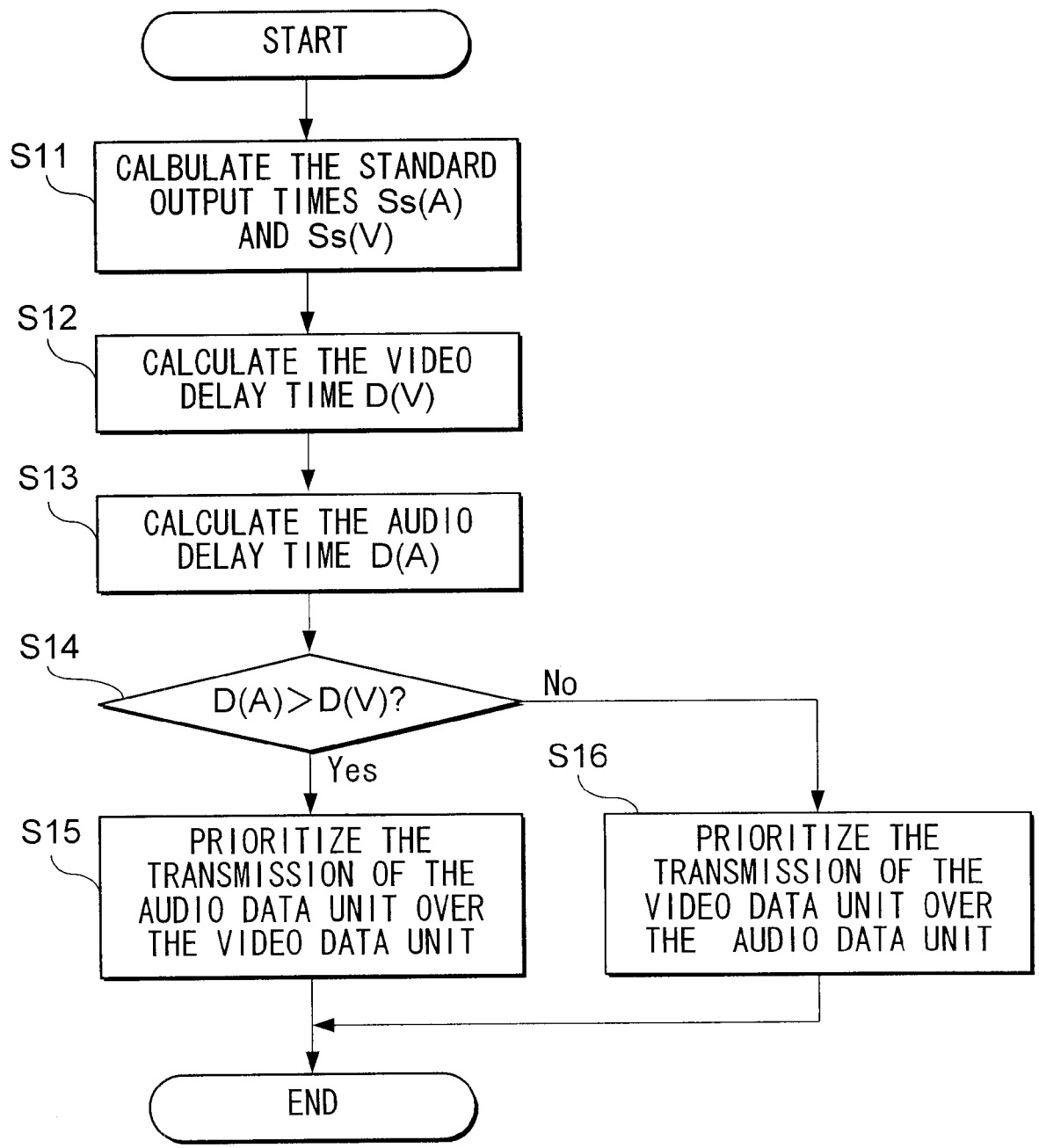
FIG. 11 is a flow chart representing a routine carried out by a prioritizer of the controller at multimedia communication.

With reference to the flowchart in FIG. 11, the prioritization routine by the prioritizer 120 will be described next. The illustrated routine is repeated at regular intervals of 1×INT.

First, if an audio data unit and a video data unit that have been output from the buffer 110 and have not been transmitted from the protocol entity 17 exist at step S11, on the basis of the output time Bs(A) of the first audio data unit, the delay calculator 123 calculates the standard output time Ss(A) of the audio data unit that has not been transmitted from the protocol entity 17 in accordance with equation(1).

$$Ss(A)=Bs(A)+(N(A)-1)\times Cy(A) \quad (1)$$

where N(A) is the serial number of the subject audio data unit in all audio data units, identifying the order of transmission of the corresponding packet by the source terminal 21, and Cy(A) is the cycle of transmission of audio packets by the terminal 21.

In addition, at step S11, on the basis of the output time Bs(V) of the first video data unit, the delay calculator 123 calculates the standard output time Ss(V) of the video data unit that has not been transmitted from the protocol entity 17 in accordance with equation (2).

$$Ss(V)=Bs(V)+(N(V)-1)\times Cy(V) \quad (2)$$

where N(V) is the serial number of the subject video data unit in all video data units, identifying the order of transmission of the corresponding packet by the source terminal 21, and Cy(V) is the cycle of transmission of video packets by the terminal 21.

Then, the delay calculator 123 calculates the video delay time D(V) of the video data unit on the basis of the standard output time Ss(V) and the current time Ct in accordance with equation (3) at step S12.

$$D(V)=Ct\times Ss(V) \quad (3)$$

The delay calculator 123 also calculates the audio delay time D(A) of the audio data unit on the basis of the standard output time Ss(A) and the current time Ct in accordance with equation (4) at step S13.

$$D(A)=Ct\times Ss(A) \quad (4)$$

Next, the determiner 124 determines whether or not the audio delay time D(A) is greater than the video delay time D(V) at step S14. If the determination at step S14 is affirmative, the determiner 124 supplies a transmission control instruction to the protocol entity 17, the instruction instructing the protocol entity 17 to prioritize the transmission of the audio data unit over the video data unit. On the other hand, if the determination at step S14 is negative, the determiner 124 supplies another transmission control instruction to the protocol entity 17, the instruction instructing the protocol entity 17 to prioritize the transmission of the video data unit over the audio data unit. Then, the routine has ended and will be repeated.

Figure 12:
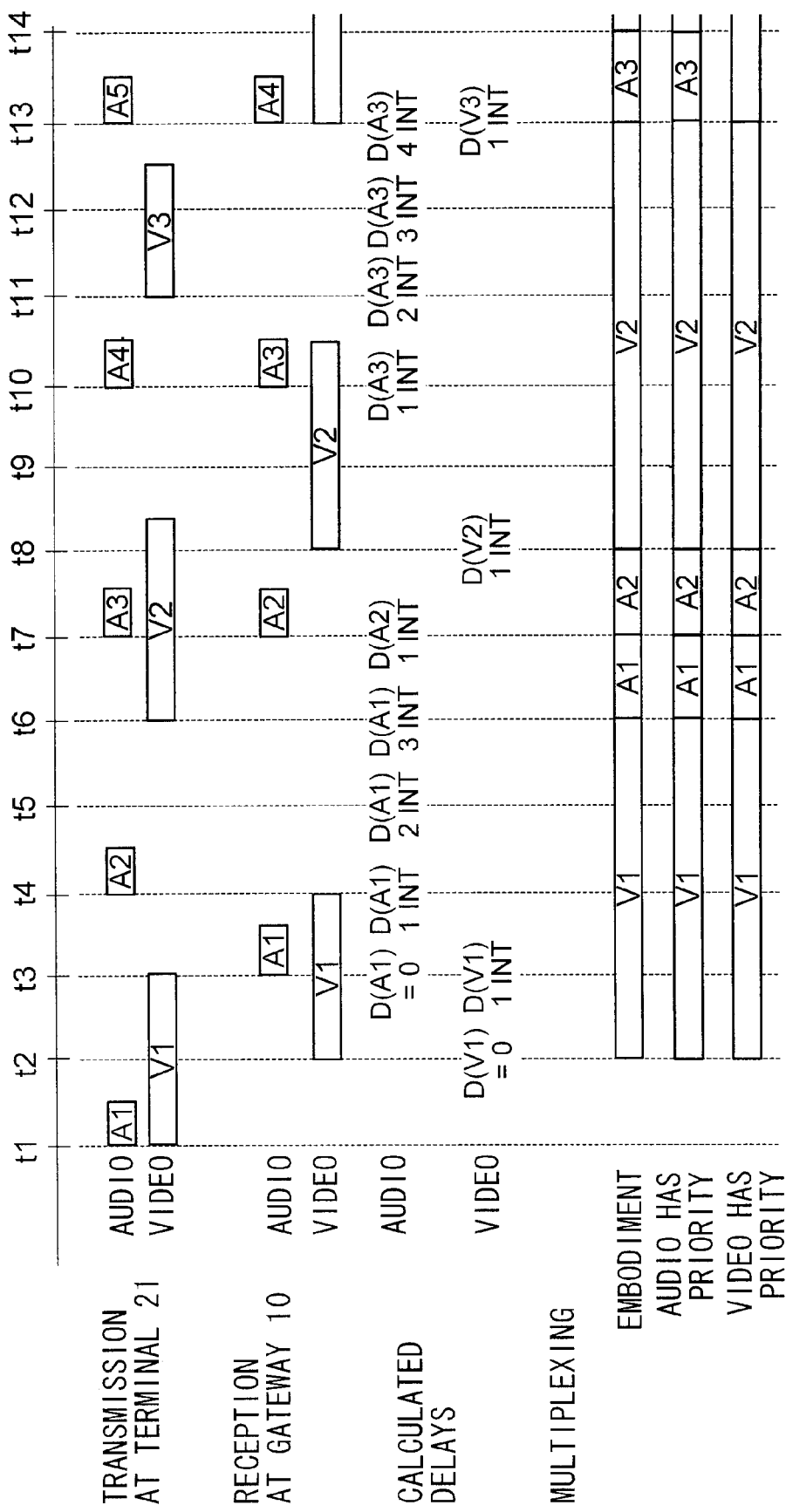
FIGS. 12 and 13 constitute a diagram showing procedures for treating data units in the gateway in FIG. 1 at multimedia communication.
Figure 13:
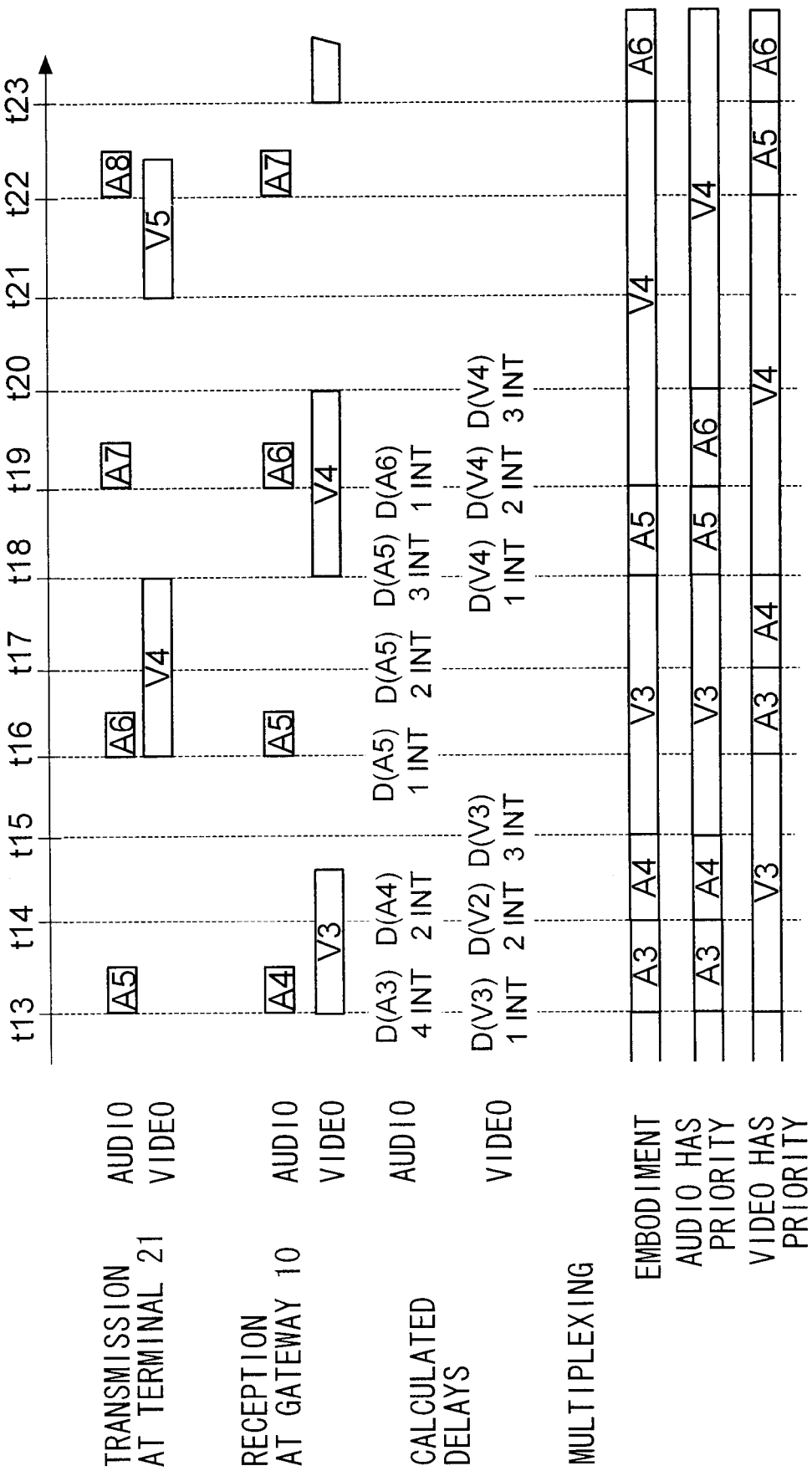

Next, with reference to the time chart illustrated in FIGS. 12 and 13, the procedure for treating data units in multimedia communication will be described. In FIGS. 12 and 13, the letter "A" identifies audio data unit corresponding to audio packet while the letter "V" identifies video data unit corresponding to video packet, and the suffixes identify the order of transmission by the source terminal 21.

First, assume that the transmission sequency of packets from the terminal 21 and output sequency of corresponding data units from the buffer 110 are as shown in FIGS. 12 and 13. That is, the packets in each form are buffered in the buffer 110 of the gateway 10 and then output in such a manner that each of the audio buffer 111 and video buffer 112 absorbs only a part of delay jitter, which has occurred in the network 20. Therefore, as illustrated in FIGS. 12 and 13, although the cycle of transmission of audio packets "A" is 3×INT, the data unit of the second audio packet A2 is output from the audio buffer 111 a period of 4×INT after the output of the data unit of the first audio packet, A1. In addition, although the cycle of transmission of video packets "V" is 5×INT, the data unit of the second video packet V2 is output from the video buffer 112 a period of 6×INT after the output of the data unit of the first video packet V1.

If each of the audio buffer 111 and video buffer 112 absorbed all of delay jitter of audio data units and video data units, all audio data units and all video data units should be output from the corresponding buffer in the same cycle as of the transmission from the source terminal 21 to the network 20. Therefore, it will be understood by FIGS. 12 and 13 that a delay jitter of 1×INT remains in the audio data group and a delay jitter of 1×INT also remains in the video data group since each buffer absorbs only a part of delay jitter.

Furthermore, since the protocol entity 17 multiplexes the audio and video data units onto a single channel for transmitting them to the network 30, delays for multiplexing occur. Accordingly, there is likelihood that delay jitter may lengthen since delay jitter for multiplexing is added to remaining delay jitter at the output from the buffer 110.

The jitter of delay caused by multiplexing by the protocol entity 17 is affected by the order of transmission of data units belonging to different form groups. More specifically, as illustrated in FIGS. 12 and 13, while all audio packets are of the same length and transmitted at regular intervals of 3×INT, video packets may have different lengths being greater than that of the audio packets and are transmitted by the terminal 21 at regular intervals of 5×INT. In such a case, the gateway 10 cannot transmit an audio data unit during the transmission of a longer video data unit even if the audio data unit should be transmitted. Therefore, a delay of the audio data unit may occur by multiplexing if no modification is added. The delay by multiplexing may be added to the remaining delay, so that the total delay jitter may be lengthened.

Various kinds of multiplexes can be conceived. For example, it is possible to always prioritize a video data unit over an audio data unit when the audio and video data units that have been output from the buffer 110 and have not been transmitted from the protocol entity 17 exist simultaneously. On the contrary, it is possible to always prioritize an audio data unit over a video data unit in the same situation. Both the multiplexes involve disadvantages, which will be described next.

In FIG. 12, at time moment t13, the data unit of the fourth audio packet A4 is output from the audio buffer 111 while the data unit of the third video packet V3 is output from the video buffer 112. Furthermore, at the same time moment, the data unit of the previous audio packet A3, which has already been output from the buffer 110, has not yet been transmitted from the protocol entity 17. At another time moment t18, while the data unit of the fourth video packet V4 is output from the video buffer 112, the data unit of the fifth audio packet A5 remains untransmitted.

At time moment t13, in the method where an audio data unit always has priority over a video data unit, the protocol entity 17 transmits the data unit of the audio packet A3 as illustrated in FIGS. 12 and 13. Then, the protocol entity 17 transmits the data unit of the audio packet A4. The data unit of the video packet V3 is eventually transmitted at step S15. Consequently, when the data unit of the video packet V3 is transmitted to the network 30, it is accompanied with a delay of 4×INT after time moment t11 at which it is transmitted from the terminal 21. Similarly, at time moment t18, the data unit of the fifth audio packet A5 has priority, and the data unit of the new audio packet A6 has also priority at step S19. Therefore, when the data unit of the fourth video packet V4 is transmitted at time moment t20 to the network 30, it has a delay of 4×INT after time moment t16 at which it is transmitted from the terminal 21. However, when the data unit of the first video packet VI is transmitted to the network 30, it is accompanied with a delay of only 1×INT after time moment t1 at which it is transmitted from the terminal 21 as shown in FIG. 12.

In the method where a video data unit always has priority over an audio data unit, the protocol entity 17 starts to transmit the data unit of the third video packet V3 at step S13 and continues to transmit it at steps S14 and 15 as illustrated in FIGS. 12 and 13. After the completion of transmission of the data unit of the video packet V3, the data unit of the third audio packet A3 output from audio buffer 111 at time moment t10 and the data unit of the fourth audio packet A4 output from audio buffer 111 at time moment t13 are transmitted. Thus, when the data unit of the audio packet A3 is transmitted at time moment t16, it is accompanied with a delay as much as 9×INT after time moment t7 at which it is transmitted from the terminal 21. In addition, when the data unit of the audio packet A4 is transmitted at time moment t17, it is accompanied with a delay of 7×INT after time moment, t10 at which it is transmitted from the terminal 21. Similarly, at time moment t18, the data unit of the forth video packet V4 has priority. Therefore, when the data unit of the fifth audio packet A5 is transmitted at time moment t22 to the network 30, it has a delay as much as 9×INT after time moment t13 at which it is transmitted from the terminal 21. In addition, when the data unit of the sixth audio packet A6 is transmitted at time moment t23 to the network 30, it has a delay as much as 7×INT after time moment t16 at which it is transmitted from the terminal 21. However, when the data unit of the first audio packet A1 is transmitted to the network 30, it is accompanied with a delay of only 5×INT after time moment t1 at which it is transmitted from the terminal 21.

As described above, if priority is always given to a data unit group, the delay jitter by multiplexing at the protocol entity 17 is added to the delay jitter occurring in the network 20, thereby broadening the total delay jitter at transmission from the gateway 10 to the network 30.

Figure 14:
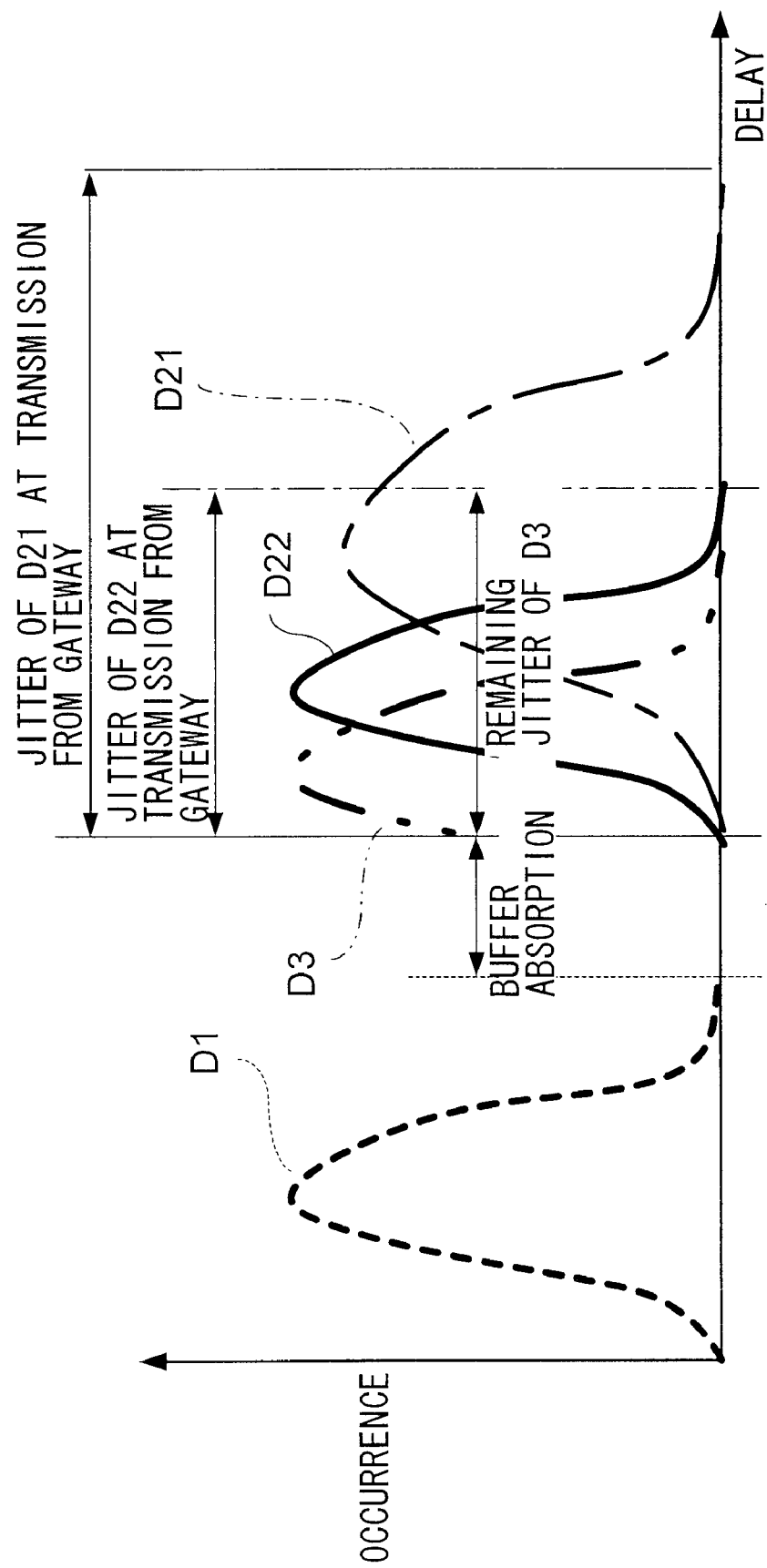
FIG. 14 is a graph for explaining the advantage of the embodiment applied to multimedia communication.

FIG. 14 shows delay occurrence patterns at multimedia communication. In FIG. 14, curved line D1 depicts the delay jitter caused by propagation through the network 20 and is equivalent to curved line D1 in the lower graph of FIG. 9. Curved line D3 depicts the remaining delay jitter after a part of the jitter has been absorbed by the buffer 110. The remaining delay jitter is less than the delay jitter of curved line D1 caused by passing through the network 20 by the amount of absorption by the buffer. Curved line D21 depicts the delay jitter at multiplexing transmission to the network 30 when priority is always given to any of data form groups. As will be clearly seen from curved line D21, although a part of delay jitter has been absorbed by the buffer 110, the delay jitter by multiplexing causes broadening the total delay jitter at transmission from the gateway 10 to the network 30.

In order to lessen delay jitter among data units, in accordance with the embodiment, precedence of data units for multiplexing is determined on the basis of delay time of each data unit. More specifically, when the audio and video data units that have been output from the buffer 110 and have not been transmitted from the protocol entity 17 exist simultaneously, priority is given to the data unit of which the delay in relation to the first same form data unit is greater. This process of the embodiment will be described next.

Referring to FIGS. 12 and 13, at time moment t13, the delay time D(A3) of the untransmitted data unit of the third audio packet A3 is 4×INT while the delay time D(V3) of the untransmitted third data unit of the video packet V3 is 1×INT. The delay time D(A) and D(V) in FIGS. 12 and 13 are calculated pursuant to equations (1) through (4) described above. According to the present embodiment, the determiner 124 supplies a transmission control instruction to the protocol entity 17 at time moment t13, the transmission control instruction indicating that the data unit of the audio packet A3 has higher priority since its delay time is greater.

At next time moment t14, the delay time D(A2) of the untransmitted data unit of the fourth audio packet A4 is 2×INT while the delay time D1(V3) of the untransmitted data unit, of the third video packet V3 is also 2×INT. According to the present embodiment, the determiner 124 supplies a transmission control instruction to the protocol entity 17 at time moment t14, the transmission control instruction indicating that the data unit of the audio packet A4 has higher priority according to the rule as described above and represented by step S14 of FIG. 11. Consequently, the data unit of the audio packet A3 is transmitted at time moment t13, the data unit, of the audio packet A4 at time moment t14, and then, the data unit of the video packet V3 is transmitted at time moment t15. This behavior is the same as that of the method where an audio data unit always has priority. However, in the stage between time moments t13 and t17, increase of delay jitter with respect to data units of audio packets A3 and A4 can be reduced.

At time moment t18, the delay time D(A5) of the untransmitted data unit of the fifth audio packet A5 is 3×INT while the delay time D(V4) of the untransmitted data unit of the fourth video packet V4 is 1×INT. According to the present embodiment, the determiner 124 supplies a transmission control instruction to the protocol entity 17 at time moment t18, the transmission control instruction indicating that the data unit of the audio packet A5 has higher priority since its delay time is greater.

At next time moment t19, the delay time D(A6) of the untransmitted data unit of the sixth audio packet A6 is 1×INT while the delay time D(V4) of the untransmitted data unit of the fourth video packet V4 is 2×INT. According to the present embodiment, the determiner 124 supplies a transmission control instruction to the protocol entity 17 at time moment t19, the transmission control instruction indicating that the data unit of the video packet V4 has higher priority since its delay time is greater. Then, the data unit of the audio packet A6, which has not been transmitted, is transmitted at time moment t23.

Consequently, when the data unit, of the audio packet A5 is transmitted at time moment t18 to the network 30, it has a delay of 5×INT after time moment t13 at which it is transmitted from the terminal 21. When the data unit of the video packet V4 is transmitted at time moment t19 to the network 30, it; has a delay of 3×INT after time moment t16 at which it is transmitted from the terminal 21. The data unit of the audio packet A6 is transmitted at time moment t23 to the network 30, having a delay of 7×INT after time moment, t16 at which it is transmitted from the terminal 21. Accordingly, increase of delay jitter with respect to the data unit of the video packet, V4 can be reduced.

Referring to FIG. 14, curved line D22 represents the delay jitter at multiplexing transmission to the network 30 when priority is determined on the basis of data unit's delay time in accordance with the embodiment. As will be understood by comparing curved lines D21 and D22 with each other, by virtue of the present embodiment, increase of delay jitter may be restricted, so that delay jitter at multiplexing resembles the remaining delay jitter (the width of curved line D3).

It is preferable that the delay jitter at multiplexing is equal to or less than the permissible delay jitter, which may be absorbed by the destination terminal 31. Accordingly, it is advantageous that the amount of delay jitter to be absorbed by the buffer determined on the basis of the permissible delay jitter before multiplexing for multimedia communication is greater than that in transferring of single form data.

Equivalents

While the present invention has been particularly shown and described with references to a preferred embodiment thereof, it will be understood by those skilled in the art that various changes in form and details may be made therein without departing from the spirit and scope of the invention as defined by the claims. Such variations, alterations, and modifications are intended to be as equivalents encompassed in the scope of the claims. Examples of such equivalents will be described in the following.

While the precedence of packets in different forms of multimedia communication may be frequently deranged in the packet-switched network 20 for network delay, there is little likelihood that such derangement of precedence in the network, which is a circuit-switched network since few network delay occurs therein. Therefore, unlike the embodiment illustrated in FIG. 1, it is possible to exclude the prioritizer 120 from the transfer system BA, which treats frames transferred from the circuit-switched network 30 having the above-mentioned merit.

It is not intended to limit the element for absorbing or reducing delay jitter to the buffer 110. Rather, another suitable element may be used for reserving the first data unit for a time period based on the permissible delay jitter in the destination terminal and for outputting subsequent data units in proper order successively.

In the above embodiment, higher priority is simply given to the data unit that has a greater delay time in multimedia communication. However, when three or more forms of data are transmitted, it is possible that priority is in advance given to data units in one or more forms and next priority is given to the data unit that has a greater delay time with respect to other data forms.

It is possible to determine the data unit to which priority is given on the basis of lengths of data units instead of the delays.

When it is preferable to transmit a shorter data unit, of which the delay time is great, during transmission of a longer data unit in a different form, it is possible to conduct an interruption transmission. Depending on conditions, such interruption transmission may further lessen delay jitter. For this purpose, it is preferable that each longer data unit is segmentized as stated in, for example, ITU-T Recommendation H.223. Accordingly, it is possible that transmission of a longer video data unit is interrupted, so that a shorter audio data unit is transmitted and then remaining segments are transmitted smoothly.

In the above-described embodiment, the network 20 is a packet-switched network while the network 30 is a circuit-switched network. It is not intended to limit the scope of the present invention to the disclosure, and variations and modifications may be made. The causes of delay jitter are network factors or multiplexing by each terminal or gateway. In a packet-switched network, network factors may cause delay jitter. On the other hand, in a circuit-switched network, although there is little likelihood that network factors cause delay jitter, frames with delay jitter caused by multiplexing may remain when they are exchanged. Delay jitter in a packet-switched network is normally greater than delay jitter caused by multiplexing by each terminal or gateway. Usually, each terminal can eliminate or absorb permissible delay jitter being equal to the maximum level of jitter that may occur in the network, to which the terminal belongs, when the terminal is the destination.

Figure 15:
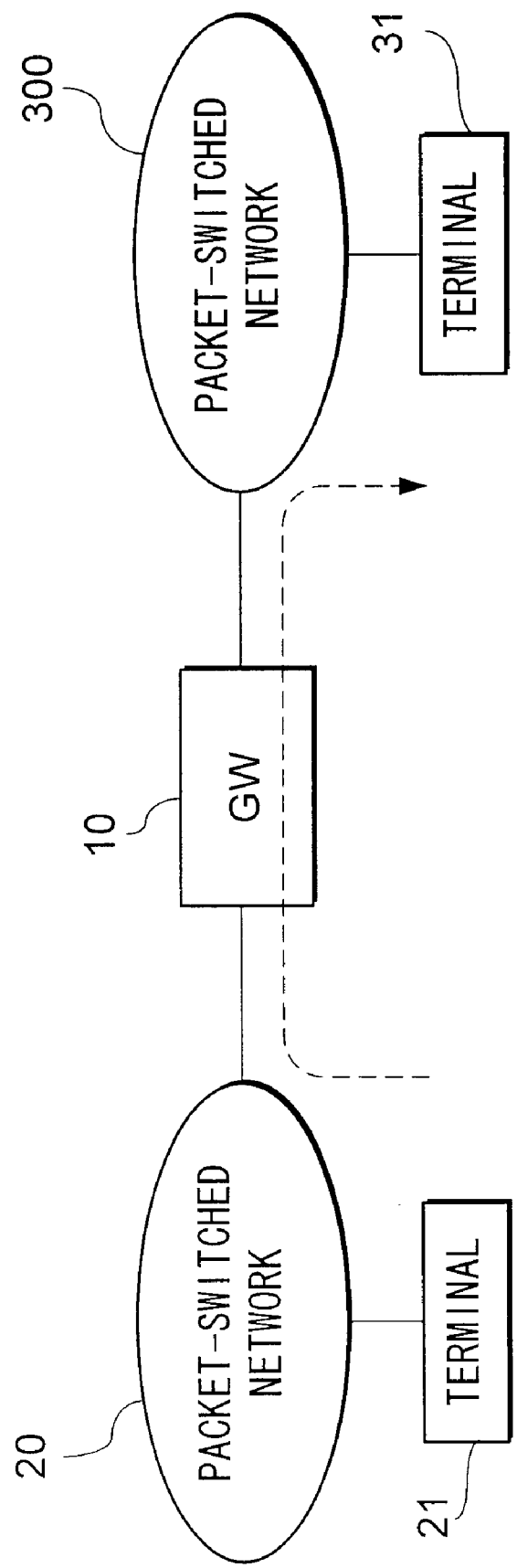
FIG. 15 is a diagram showing a second embodiment according to the present invention.

Assume in a second embodiment in accordance with the present invention in FIG. 15, both networks 20 and 300 are packet-switched networks, and the likely maximum delay jitter in the packet-switched network 20 is greater than that in the packet-switched network 30. In this case, if the source terminal is a terminal served by the network 20 and the destination terminal belongs to the network 300, it is advantageous that the gateway 10 absorbs a part, of the delay jitter, which has occurred in the source-side network 20, in accordance with the dejitterizing capability of the destination terminal 31 as similar to the above-described embodiment.

However, if the source terminal is a terminal served by the network 300 where likely delay jitter is smaller and destination terminal belongs to the network 20 where likely delay jitter is greater, and if the dejitterizing capability of the destination terminal is high, it may not be strictly necessary that the gateway 10 absorbs a part of delay jitter caused in the source-side network 300. In such cases, it is possible to exclude the elements for dejitterizing from the transfer system BA, which transfers data from the network 300 to the network 20.

As described with reference to the first embodiment, if the source-side network 20 is a packet-switched network and the destination-side network 30 is a circuit-switched network, it is advantageous that the gateway 10 absorbs a part of the delay jitter, which has occurred in the source-side network 20, in accordance with the dejitterizing capability of the destination terminal 31. In contrast, if the source terminal is a terminal served by the circuit-switched network 30 where likely delay jitter is smaller and the destination terminal belongs to the packet-switched network 20 where likely delay jitter is greater, and if the dejitterizing capability of the destination is high, it may not be strictly necessary that the gateway 10 absorbs a part of the delay jitter caused in the source-side network 30. In such cases, it is also possible to exclude the dejitterizing elements from the transfer system BA.

As mentioned above, in a circuit-switched network, while network factors hardly cause delay jitter, frames with delay jitter by multiplexing may remain when they are exchanged. Accordingly, the permissible delay jitter, which is allowed in a destination terminal belonging to the circuit-switched network and is a parameter for determining the amount to be absorbed by the buffer, may be equal to the maximum delay time that may occur in the circuit-switched network by multiplexing.

What is claimed is:

1. A gateway for interconnecting two networks, comprising:

a receiver for receiving from a first network a plurality of data units in at least one form;

a controller for temporarily storing in a buffer the data units received by the receiver and for outputting the data units stored in the buffer to a destination terminal served by a second network while reducing jitter of the data units output by the controller; and a transmitter for sending data units corresponding to the data units corresponding to the data units output by the controller to the destination terminal through the second network, wherein the controlled is adapted to reduce the jitter of the data units to within a permissible delay jitter limit which is determined on the basis of reducing jitter capability of the destination terminal, and wherein the controller includes:

an output time detector for detecting a first time moment at which a first data unit in each form is output from the controller; and a delay calculator for calculating the delay time of each data unit based an the first time moment, wherein the controller determines the precedence, so as to transmit the data unit of which the determined delay time is longer than that of the other data unit, with priority over the other data unit.

2. A gateway according to claim 1, further comprising an acquirer for acquiring information on the permissible delay jitter limit determined on the basis of reducing jitter capability of the destination terminal.

3. A gateway according to claim 1, wherein the controller determines a time period on the basis of the permissible delay jitter limit determined by the capability of the destination terminal, outputs a first data unit of the data units after the determined time period has passed since a time moment at which the receiver received the first data unit, and outputs subsequent data units successively in an order which is the same as that of transmission by the first network.

4. A gateway according to claim 1, wherein the receiver is capable of receiving, from the first network, data units of different forms, the controller determining a precedence, in which the transmission of data units by the transmitter is carried out, in accordance with delay time of each data unit occurring in propagation through the first network when untransmitted data units in different forms exist simultaneously, the transmitter multiplexing the corresponding data units onto a channel in accordance with the precedence to send the corresponding data units to the destination terminal through the second network.

5. A gateway according to claim 3, wherein the controller obtains the time period by shortening a maximum delay time, which may occur in propagation of data units through the first network, on the basis of a permissible delay jitter limit determined on the basis of the reducing litter capability of the destination terminal.

6. A method for transferring data, comprising:
    receiving from a first network a plurality of data units in at least one form;
    temporarily storing the data units;
    reducing jitter of the data units; and
    sending data units corresponding to the data units which have undergone jitter reducing, through a second network to a destination terminal served by the second network,
    wherein reducing liter of the data units comprises:
    detecting a first time moment at which a first data unit in each form is output from the controller;
    calculating the delay time of each data unit based on the first time moment; and
    determining a precedence, so as to transmit the data unit, of which the determined delay time is longer than that of the other data unit, with priority over the other data unit, and
    wherein the jitter of thee data units is reduced to within a permissible delay jitter limit which is determined on the basis of reducing jitter capability of the destination terminal.

7. A method according to claim 6, wherein reducing includes:
    determining a time period on the basis of a preacquired permissible delay jitter limit determined on the basis of the reducing jitter capability of the destination terminal;
    outputting a first data unit of the data units after the determined time period has passed since a time moment at which a receiver received the first data unit; and
    outputting subsequent data units successively in an order which is the same as that of transmission by the first network,
    wherein the time period is obtained by shortening a maximum delay time, which may occur in propagation of data units through the first network, on the basis of a permissible delay jitter limit determined on the basis of the reducing jitter capability of the destination terminal.

8. A method according to claim 6, wherein receiving includes receiving data units in different forms, the method further comprising determining a precedence, in which the transmission of data units by the transmitter is carried out, in accordance with delay time to each data unit occurring in propagation through the first network when untransmitted data units in different forms exist simultaneously, wherein the controller determines the precedence, so as to prioritize the transmission of the data unit of which the delay time is determined to be longer than that of the other data unit, over the other data unit.

9. A data sequence that receives streams of data units and outputs the data units in one sequence, comprising:
    a receiver that receives the streams of data units transmitted over a delay causing environment in which variances of delays are incurred by the data units during transmission;
    at least one buffer that stores the received data units separately by stream and holds them for prescribed time periods to reduce the variances of delays to within a DELAY variance tolerable at a destination of the streams of data units;
    a delay calculator that calculates an amount of delay for each of the data units outputted from the at least one buffer; and
    a multiplexer that receives the streams of data units in parallel from the at least one buffer and outputs the received data units in one sequence, wherein when a plurality of data units are waiting to be outputted, the multiplexer first outputs, among the plurality of data units, a data unit with the highest amount of delay calculated by the delay calculator.

10. A data sequencer according to claim 9, wherein one steam of data units is a stream of audio data.

11. A data sequencer according to claim 9, wherein one stream of data units is a stream of video data.

12. A data sequencer according to claim 9, wherein an amount of delay for a data unit in a stream is calculated based on a point of time at which a first data unit in the stream is outputted from the at least one buffer.

13. A data sequencer according to claim 9, wherein an amount of delay for a data unit is calculated from a point of time at which the-data unit should have been outputted from the at least one buffer but for a delay incurred by the data unit during transmission over the-delay causing environment.

14. A data sequencer according to claim 9, wherein an amount of delay for a data unit comprises an amount of time waited by the data unit to be outputted after the data unit is outputted from the at least one buffer.

15. A data sequencer according to claim 9, wherein when a plurality of data units with the same amount of delay are wafting to be outputted, the multiplexer first outputs one of the plurality of data unites according to a predetermined rule.

* * * * *